Aug. 19, 1947.  H. N. BLISS  2,426,079
REMOTE CONTROLLED ELECTRICAL INDICATOR
Filed June 19, 1944  4 Sheets-Sheet 1

INVENTOR.
HARVEY N. BLISS
BY
Lindsey and Robillard
ATTORNEY

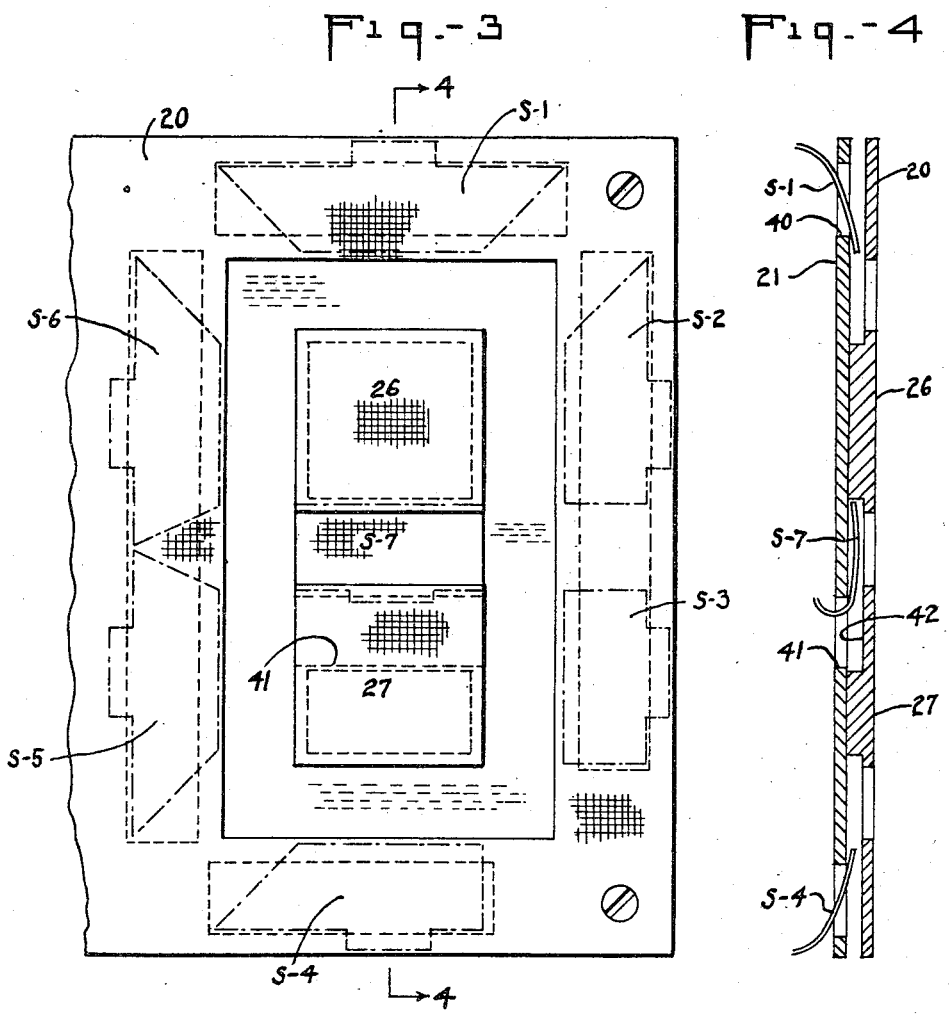

Aug. 19, 1947.                     H. N. BLISS                        2,426,079
                    REMOTE CONTROLLED ELECTRICAL INDICATOR
                    Filed June 19, 1944              4 Sheets-Sheet 3
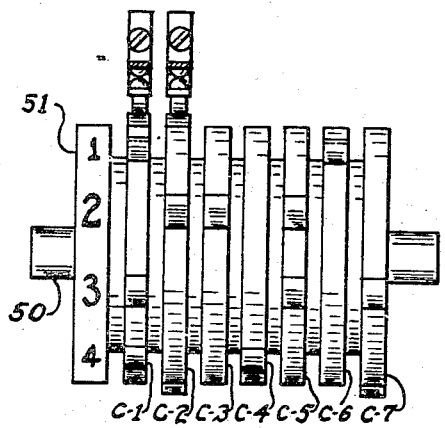
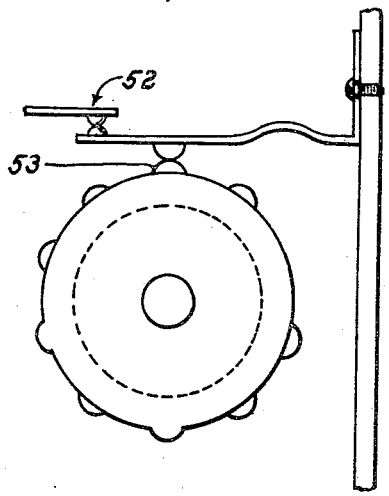
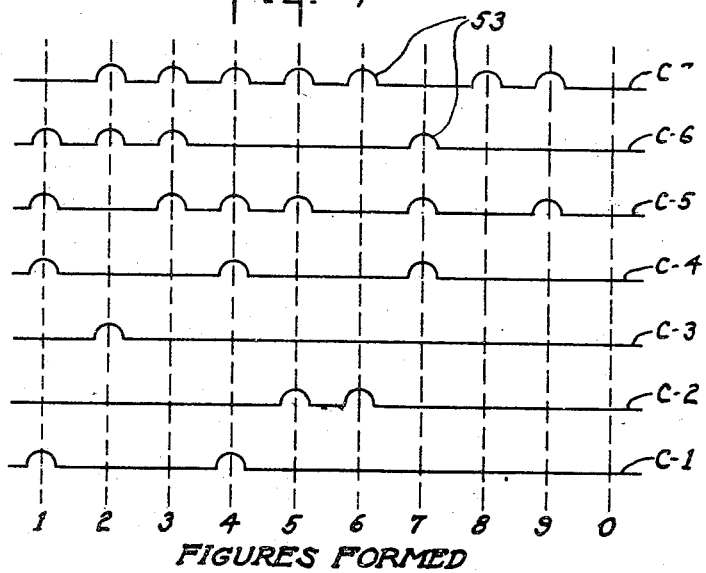
Inventor
HARVEY N. BLISS
By Lindsey and Robillard.
Attorney

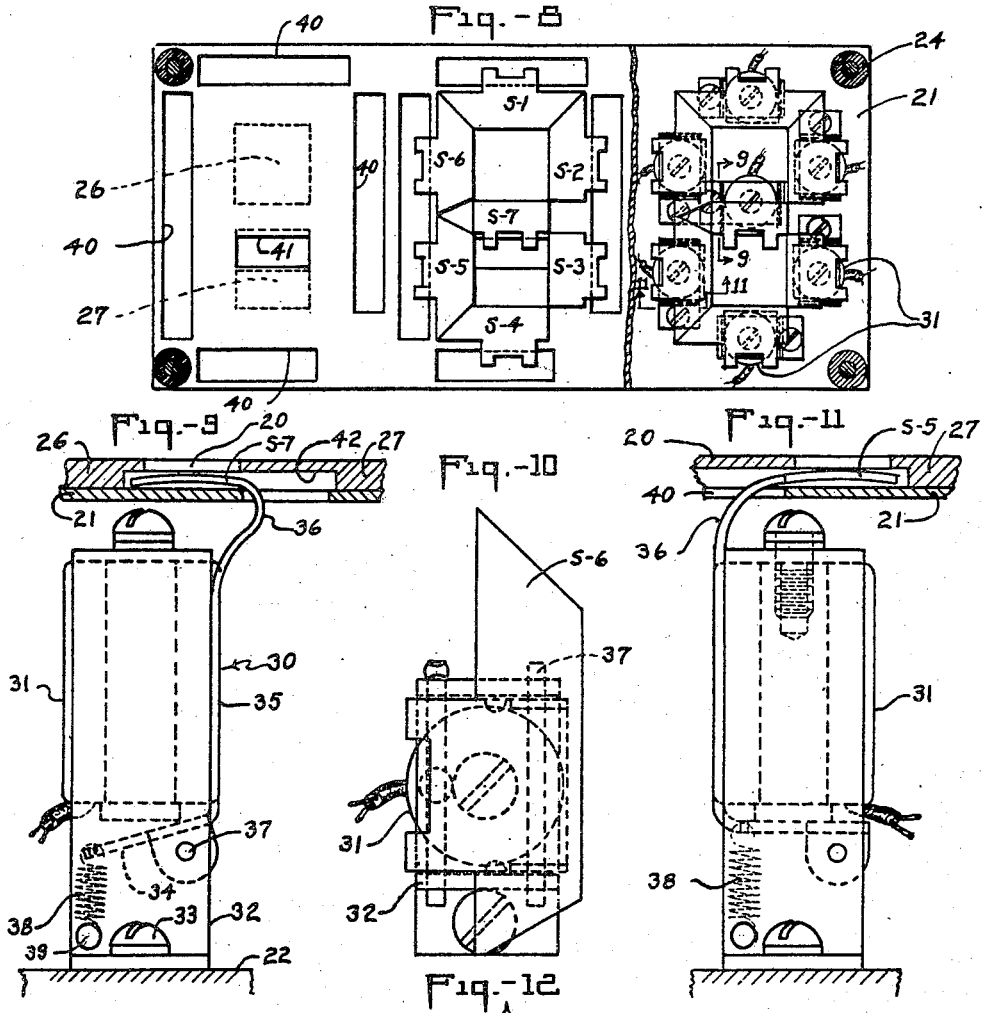

Patented Aug. 19, 1947

2,426,079

UNITED STATES PATENT OFFICE 2,426,079

REMOTE-CONTROLLED ELECTRICAL INDICATOR

Harvey N. Bliss, Windsor, Conn., assignor to Veeder-Root Incorporated, Hartford, Conn., a corporation of Connecticut Application June 19, 1944, Serial No. 540,919

6 Claims. (Cl. 177—337)

The present invention relates to registering or indicating mechanisms.

The aim of the invention is to provide an improved registering or indicating mechanism of such construction that numerals of large size may be employed whereby the register may be very easily and quickly read from a considerable distance.

A further aim of the invention is to provide an improved registering or indicating mechanism having various features of novelty and advantage and which is characterized by its simplicity in construction, its economy in manufacture, and its reliability in operation.

A further object is to provide a device only a fraction of the size of prior devices using number wheels.

A still further aim of the invention is to provide a registering or indicating mechanism which may be positioned at any desired distance from the controlling means therefor.

Another object is to provide an improved device of this character which is capable of operation at high speeds.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

My improved registering or indicating mechanism comprises generally a plate structure having a front face provided with master figures in the form of the numeral 8, the master figures being of a contrasting color to the front face; a plurality of shutters associated with each figure 8 and arranged to selectively mask portions of the figure so as to form the numerals 0 to 9; and means for moving the shutters into and out of masking relation.

Referring to the drawings in detail, wherein is shown one embodiment which the present invention may take:

Fig. 3 is a partial front view of the mechanism with the shutters associated with the right-hand master figure 8 in such position as to make the numeral 0;

Fig. 4 is a vertical sectional view taken on line 4—4 of Fig. 3;

Fig. 5 is a view, somewhat diagrammatic, of the controlling device for moving the shutters in such sequence as to successively form the numerals 0 to 9;

Fig. 6 is an end view of the controlling device shown in Fig. 5;

Fig. 7 is a diagrammatic view showing the relation of the several cams of the controlling device with the shutters;

Fig. 8 is a view similar to Fig. 1 but with the front or face plate removed and parts being omitted in the interest of clarity;

Fig. 9 is a detail view showing in edge relation the centrally located shutter, this view being taken substantially on line 9—9 of Fig. 8;

Fig. 10 is a front view of the upper left hand shutter and the solenoid associated therewith;

Fig. 11 is a horizontal sectional view taken substantially on line 11—11 of Fig. 8 and shows the lower left hand shutter and the solenoid for operating the same; and Fig. 12 is a view showing the several numerals which are formed.

Figure 1:
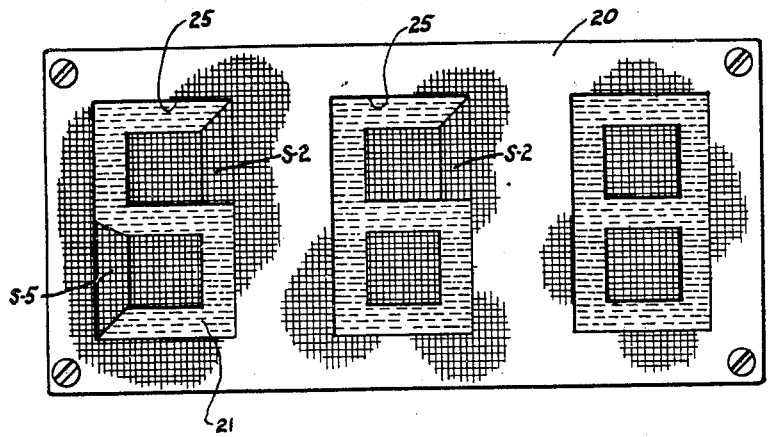
Figure 1 is a front view of a registering mechanism constructed in accordance with the present invention.
Figure 2:
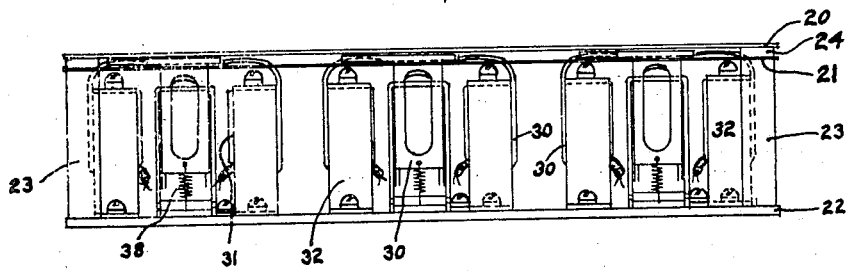
Fig. 2 is a bottom edge view thereof.

Referring to the drawings in detail, my improved registering mechanism is shown for illustrative purposes as having a plate structure comprising a front plate 20, a background plate 21 positioned slightly behind the front plate, and a base plate 22. The several plates are secured together by pillars 23. The plates 20 and 21 are slightly spaced apart by washers 24. The front plate is provided with rectangular openings 25 spaced side by side. Within each of these openings and secured to the background plate 21, as by means of solder or the like, are two filler blocks 26 and 27, the front faces of which are flush with the front face of the front plate. These blocks are so positioned as to form, with each opening 25, a master figure 8. The front face of the front plate and the faces of the filler blocks are of one color, for instance black as indicated, and the front face of the background plate is of a contrasting color, for example white or silver. In the drawings three master figures are illustrated, but any suitable number may be employed. The right hand master figure may be considered as the one of lowest order, for example "units." The central figure may represent "tens" and the left hand one "hundreds."

Associated with each master figure 8 are a plurality, in the present instance seven, shutters arranged to mask respectively different portions of the figure. As the shutters associated with each figure are similar, a description of one set of shutters will apply to all. The shutters are respectively indicated by the references S—1 to S—7. These shutters are arranged to mask the several portions of the master figure 8 as follows: S—1, the top cross bar; S—2, the upper half of the right vertical bar; S—3, the lower half of the right vertical bar; S—4, the bottom cross bar; S—5, the lower half of the left vertical bar; S—6, the upper half of the left vertical bar; and S—7, the middle cross bar. In the present illustrative disclosure, these shutters are located in the space between the plates 20 and 21 and are carried by armatures 30 of solenoids 31. The solenoids are fixed to brackets 32 which are secured to the base plate 22, as by means of screws 33. Each armature has an armature arm 34 located behind the armature, and a forwardly extending arm 35 the forward end of which carries a shutter. Between the shutter and the arm 35 is a bend or crook 36. The armatures are pivoted to the brackets 32 as at 37. The solenoid associated with the shutter S—7, which is employed to mask the space between the filler blocks 26 and 27, is shown in Fig. 9. As there shown, the shutter S—7 is in masking position when the solenoid associated therewith is not energized. It is resiliently held in masking position by means of a spring 38. The remaining solenoids and their associated shutters are exemplified by the arrangement shown in Fig. 11. These shutters are so associated with their respective solenoids that when the solenoids are energized, the shutters are moved into and held in masking position, as shown by Fig. 11. Upon deenergization of any of these solenoids, the shutter associated therewith is moved to unmasking position by the spring 38 associated therewith. One end of each spring 38 is connected to the free end of the armature arm 34 and the other end to a pin 39 carried by the bracket 32.

In order that the background plate 21 does not interfere with movement of the shutters, this plate is provided with slots 40 disposed about the area of the master figure 8, and a central slot 41. The crooked or bent portions 36 of the armatures extend through these slots. The slot 41 accommodates the crooked portion of the armature which carries the central shutter S—7, as shown in Fig. 9. The lower filler block 27 is rabbeted or cut away, as at 42, so as to accommodate the shutter S—7 in its unmasked position. The shutters are slightly curved in the direction in which they move in order that the space between the plates 20 and 21 may be quite small. The forward face of each shutter is colored correspondingly to the front face of the front plate 20, in the present instance black.

Movement of the shutters into and out of masking positions may be controlled in any suitable way depending on the use to which it is desired to apply the device. In the event the device is used as a counter where the numerals successively appear in regular order, the shutters may be electrically controlled from the small remote control device such as shown in Figs. 5 and 6. This device has a driven shaft 50 adapted to be connected to a machine or apparatus, the functions or operations of which are to be counted; for example, this shaft may be connected up to the meter shaft of a liquid dispensing pump in the event that my improved arrangement is used for indicating the amount of liquid or the cost of liquid dispensed by such pump. Carried by the shaft is a single counter wheel 51 having numerals running from "0" to "9" on its periphery. Also carried by the shaft are cams C—1 to C—7 which are respectively associated with the solenoids of the several shutters. Associated with each cam is a switch 52 connected to a respective solenoid. The cams have lobes 53 which, when the cams rotate, are adapted to close the respective switches.

In Fig. 7, the cams are diagrammatically shown in relation to the respective shutters and the several numerals formed in the master figure 8.

As previously stated, the shutter S—7 which masks the central cross bar of the figure 8 is moved into masking position by its associated spring 38 and is moved out of masking position by its associated solenoid 31, whereas the reverse is true of the other shutters. This arrangement is provided so that when the current is "off," the reading will be "0," "0," "0" in the openings 25 of the front plate 20.

The operation of the device is briefly as follows: Assuming that the remote control device shown in Figs. 5 and 6 is associated with the shutters of the right hand master figure 8 and that the remote control device is in zero position, the central shutter is in masking position and the other shutters are in unmasked positions so that the figure appears as a "zero." Upon rotation of the control device, the master figure 8 is successively changed to the numerals 1 to 9, the position of the various shutters for the respective numerals being as follows:

| Numeral | Shutters in Masked Position | Shutters in Unmasked Position |
|---|---|---|
| 1 | 1—4—5—6—7 | 2—3. |
| 2 | 6—3 | 1—2—4—5—7. |
| 3 | 6—5 | 1—2—3—4—7. |
| 4 | 1—4—5 | 2—3—6—7. |
| 5 | 2—5 | 1—3—4—6—7. |
| 6 | 2 | 1—3—4—5—6—7. |
| 7 | 4—5—6—7 | 1—2—3. |
| 8 | none | all. |
| 9 | 5 | 1—2—3—4—6—7. |

Suitable transfer means would be provided between the master figure of the first order and the master figure of the next order so that, as the numeral of the first order changes from "9" to "0," the numeral of the second order would be raised one digit. Like transfer means would be provided between the figure of the second order and the figure of the third order. No transfer means is shown in the present instance as such transfer means may correspond to the remote control device shown in Figs. 5 and 6.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In a mechanism of the character described, a plate structure having a front face with a master figure 8 therein provided with a background, the front face of said plate structure being of a color contrasting with the color of said background, shutters respectively associated with the several portions of the figure and having their front faces of the same color as said front face and movable into and out of masking relation with said figure so as to form the numerals 0 to 9 and means for supporting said shutters for movement into and out of such masking relation.

2. In a mechanism of the character described, a plate structure having a front face with a master figure 8 therein provided with a background, the front face of said plate structure being of one color and said background of said master figure being of a contrasting color, shutters respectively associated with the several portions of the figure and having their front faces of the same color as said front face and movable into and out of masking relation with said figure so as to form the numerals 0 to 9, means for supporting said shutters for movement into and out of such masking relation and control means for automatically moving said shutters into and out of masking positions in a recurrent sequence of combinations to produce indications of 0 to 9.

3. In a mechanism of the character described, a plate structure having a colored front face provided with an opening in the form of a master figure 8 said master figure being provided with a background of a color in contrast to the color of the front face, shutters disposed between the planes of the front face of the plate and the background of the master figure and having their front faces of the same color as said front face, said shutters being respectively arranged to be moved into and out of masking relation with the upper, middle, and bottom cross bars and the upper and lower halves of the vertical bars of the figure whereby numerals 0 to 9 may be formed by the unmasked portions of the master figure, means for supporting said shutters for movement into and out of such masking relation and remote control means for moving said shutters into and out of masking relation.

4. In a mechanism of the character described, a plate structure having a front plate and a background plate spaced rearwardly of the front plate, the front plate having an opening therein in the form of a master figure 8, the front face of the front plate being of one color and the forward face of the background plate being of a contrasting color, a plurality of shutters between said plates and respectively associated with the several portions of said figure and movable into and out of masking relation therewith, and means for supporting said shutters for movement into and out of such masking relation the forward faces of said shutters being of the same color as the front face of the front plate.

5. In a mechanism of the character described, a plate structure having a colored front face provided with an opening in the form of a master figure 8 said master figure being provided with a background of a color in contrast to the color of the front face, shutters disposed between the planes of the front face of the plate and the background of the master figure and having their front faces of the same color as said front face, said shutters being respectively arranged to be moved into and out of masking relation with the upper, middle, and bottom cross bars and the upper and lower halves of the vertical bars of the figure whereby numerals 0 to 9 may be formed by the unmasked portions of the master figure, solenoids respectively associated with said shutters for moving said shutters into and out of masking relation, and remote control means for energizing said solenoids in a recurrent sequence of combinations.

6. In a mechanism of the character described, a front plate and a background plate spaced rearwardly thereof, the front plate having an opening therein in the form of a master figure 8, the front face of the front plate being of one color and the forward face of the background plate being of a contrasting color, and a plurality of shutters between said plates and respectively associated with the several portions of said figure and arranged to be moved into and out of masking position behind said opening, the front forward faces of said shutters being of the same color as the front face of the front plate, solenoids disposed behind said background plate and each having a magnet and a pivoted armature, said shutters being respectively connected to said armatures, said background plate having slots therein through which the armatures extend.

HARVEY N. BLISS.

REFERENCES CITED

The following references are of record in the file of this patent:

UNITED STATES PATENTS

| Number | Name | Date |
|---|---|---|
| 755,272 | Burnham | Mar. 22, 1904 |
| 1,091,335 | Herrmann | Mar. 24, 1914 |
| 1,357,457 | Jorgensen | Mar. 2, 1920 |
| 729,599 | Jolly | June 2, 1903 |
| 773,931 | Perow | Nov. 1, 1904 |
| 1,390,039 | Jones | Sept. 6, 1921 |
| 2,094,133 | Nelson et al. | Sept. 28, 1937 |